(12) United States Patent
Manetsberger et al.

(10) Patent No.: US 6,858,816 B2
(45) Date of Patent: Feb. 22, 2005

(54) METHOD AND DEVICE FOR SELECTIVE LASER SINTERING

(75) Inventors: Karsten Manetsberger, Ulm (DE); Jiafin Shen, Blaustaln (DE); Juergen Steinberger, Groebenzell (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/419,432

(22) Filed: Apr. 21, 2003

(65) Prior Publication Data

US 2003/0201255 A1 Oct. 30, 2003

Related U.S. Application Data

(62) Division of application No. 10/079,704, filed on Feb. 20, 2002, now Pat. No. 6,617,546.

(30) Foreign Application Priority Data

Feb. 22, 2001 (DE) .......................................... 101 08 612

(51) Int. Cl.[7] ........................... B23K 26/00; B29C 35/08
(52) U.S. Cl. ................................... 219/121.85; 264/497
(58) Field of Search .......................... 219/121.85, 121.6, 219/121.63, 121.64, 121.65, 121.66; 264/497; 432/18, 9, 10, 12

(56) References Cited

U.S. PATENT DOCUMENTS

| | | | | | |
|---|---|---|---|---|---|
| 3,777,810 | A | * | 12/1973 | Phillips | 165/92 |
| 4,518,351 | A | * | 5/1985 | Mellen, Sr. | 432/18 |
| 5,155,321 | A | * | 10/1992 | Grube et al. | 264/497 |
| 5,496,768 | A | * | 3/1996 | Kudo | 438/487 |
| 5,578,231 | A | * | 11/1996 | Schippers et al. | 219/388 |
| 5,923,966 | A | * | 7/1999 | Teramoto et al. | 438/162 |
| 6,479,362 | B2 | * | 11/2002 | Cunningham | 219/390 |

* cited by examiner

Primary Examiner—Jonathan Johnson
(74) Attorney, Agent, or Firm—Davidson, Davidson & Kappel, LLC

(57) ABSTRACT

The present invention relates to a method and a device for selective laser sintering in which powder is introduced in layers into a jacketed design space, forming a powder cake which is consolidated layerwise by laser radiation. The design space is encircled and heated by a jacket heating device.

4 Claims, 1 Drawing Sheet

METHOD AND DEVICE FOR SELECTIVE LASER SINTERING

CROSS-REFERENCE TO RELATED APPLICATIONS

This application is a divisional application of U.S. Pat. application Ser. No. 10/079,704 filed Feb. 20, 2002, now U.S. Pat. No. 6,617,546.

Priority to German Patent Application No. 101 08 612.1-24, filed Feb. 22, 2001 and hereby incorporated by reference herein, is claimed.

BACKGROUND INFORMATION

The present invention relates to a method and a device for selective laser sintering in which powder is introduced in layers into a jacketed design space, forming a powder cake which is consolidated layerwise using laser radiation.

Selective laser sintering (SLS) is a rapid prototyping method in which a platform (design space bottom) which can be lowered into a design space carries a powder layer which is heated by a laser beam in selected regions so that the powder particles fuse to form a first layer. Subsequently, the platform is lowered downward into the design space by approximately 50 to 200 μm (depending on the particle size and type), and a new powder layer is applied. The laser beam draws its path again, fusing together the powder particles of the second layer as well as the second with the first layer. In this manner, a multilayer powder cake and, inside of it, a component such as an injection mold are formed little by little.

Inside of the design space, specific regions undergo a heating by the laser beam for a longer or shorter period of time, depending on the geometry of the component to be manufactured, whereas others are not heated at all. Moreover, in each case only the uppermost powder layer is heated by the laser; the lower layers give off the absorbed heat to their surroundings and cool off. The consequences include inhomogeneous temperature distributions and thermal stress within the powder cake which may result in component distortion.

To minimize this problem, it was already proposed in European Patent Document EP 556 291 to adjust a uniform base temperature of the respective surface layer, using a ring-shaped radiant heater mounted parallel to and above it. The intended result is a more uniform cooling of the individual layers and, consequently, less component distortion. This European Patent Document is related to U.S. Pat. No. 5,155,321, which is hereby incorporated by reference herein.

However, several tests have shown that temperature gradients still occur within and between the individual layers of which, in particular, those mentioned first result in component distortion which is not tolerable at least in the case of high-quality components.

SUMMARY OF THE INVENTION

An object of the present invention is to provide a method and a device for selective laser sintering in which the temperature within a layer of the deposited powder cake is as homogenous as possible and decreases as uniformly as possible, starting from the sintered regions of the surface down to the bottom of the design space.

The present invention provides a method for selective laser sintering of a powder in which the powder is introduced in layers into a jacketed design space, forming a powder cake, wherein the jacket is heated in such a manner that a temperature distribution develops in the jacket, the temperature in the jacket decreasing in the direction of the design space bottom, starting from the jacket regions bordering the powder cake surface which was sintered last.

The selective laser sintering carried out according to the present invention reduces component distortion since the temperature distribution within a layer of the deposited powder cake is homogenized better and decreases more uniformly, starting from the sintered regions of the surface down to the bottom of the design space.

This homogenization of the temperature distribution within a layer and of the temperature decrease is attained in that an additional temperature distribution featuring a decreasing temperature in the direction of the design space bottom is superposed via the jacket heating upon the temperature distribution generated by the laser radiation and, possibly, upon that generated by a ring-shaped radiant heater. This additional temperature distribution must, of course, not reach temperatures which would give rise to an independent sintering of the powder articles. It rather predetermines an essentially uniform base temperature of the individual powder layers so as to minimize the temperature dissipation of the sintered regions within a layer and to promote a temperature flow from the sintered regions into the depth, that is in a direction perpendicular to the powder layers. A suitable temperature distribution is, for example, a linear one.

The powder cake continuously grows by adding new powder layers and is at the same time lowered into the design space. In the process, the surface of the powder cake always borders the top edge of the design space. However, the platform of the design space bottom moves further and further away from the powder surface and borders regions of the design space wall which have lower and lower temperatures as the depth increases.

Therefore, it is advantageous for the jacket heating to include a design space bottom heating which is controlled in such a manner that the temperature of the design space bottom is, at each instant, adapted to the temperature of the design space wall region which it borders at this point in time.

It is particular advantageous to select an arbitrary, for example, also a non-linear and time-variant temperature distribution of the jacket heating which was optimized with regard to reduced component distortion with the assistance of a simulation of the laser sintering process. Simulations of the energy input of the laser into the powder layers have already been proposed, for example, in German Patent Document DE 10050280; the resulting temperature distributions within the powder cake can also be determined using known methods, for example, by solving the equation of heat conduction and, also, the influence on this temperature distribution by superposition of a jacket heating. Optimization methods are also known to one skilled in the art. Individual steps of the simulation can be experimentally verified or substituted.

The present invention also provides a device for selective laser sintering of a powder which features a jacketed design space for receiving the powder and which has a jacket heating device encircling the design space, wherein the jacket heating is able to heat different regions of the jacket separately.

The jacket heating device presets an essentially uniform base temperature of the individual powder layers so as to minimize the temperature dissipation of the sintered regions within a layer and to promote a temperature flow from the sintered regions into the depth, that is in a direction perpendicular to the powder layers. In this manner, thermal stress and, also, a resulting component distortion are minimized.

Advantageously, the jacket heating device is designed in such a manner that it can heat different regions of the jacket separately. For instance, in the case of a design space having a cylindrical configuration, this can easily be effected using heating rings which are disposed in parallel one over another and an arranged concentrically around the design space. In addition to such an active heating, an active cooling via cooling circuits (e.g., piping) containing a coolant (e.g., water) can be advantageous as well.

In this context, it turns out to be particularly advantageous if the individual heating rings can also be separately controlled via at least one control device; and if this at least one control device features an input unit into which a temperature distribution can be entered. This temperature distribution can, for example, be one that is optimized via simulation of the laser sintering process with regard to homogeneity and/or reduced component distortion.

BRIEF DESCRIPTION OF THE DRAWING

The device of the present invention will be further elucidated with reference to the drawings, in which.

DETAILED DESCRIPTION

Figure 1:
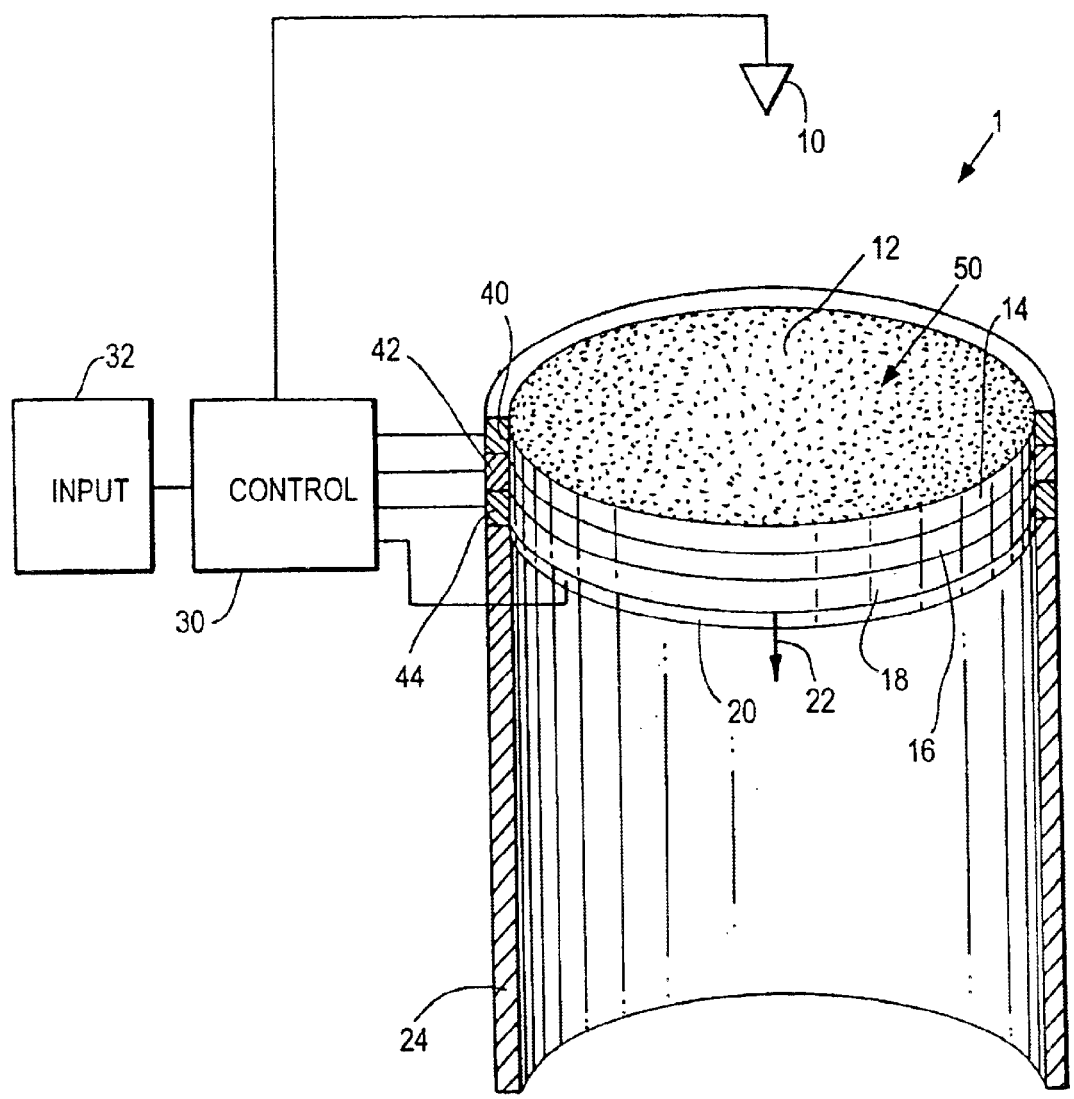
FIG. 1 shows schematically a device for selective laser sintering according to the present invention.

FIG. 1 shows schematically one embodiment of a device 1 for selective laser sintering according to the present invention in which a laser 10 can sinter a surface 12 of a powder cake 50 including layers 14, 16 and 18. The layer 18 rests on a movable bottom 20 of a cylindrical jacket 24, the bottom capable of moving in direction 22 in a controlled manner by controller 30.

Integral with or forming part of jacket 24 are heating rings 40, 42, 44, here shown only in half their circumferential extent for clarity, which can provide a temperature gradient to the jacket 24 and thus to the layers.

Controller 30 can control the both the laser 10, and the temperature in the rings 40, 42, 44 to set a desired temperature gradient within the jacket 24. An input unit can be used to set the different temperatures of the rings 40, 42, 44 and/or bottom 20.

Other heating or temperature control devices can be used, however, including ones that are separate from the jacket.

What is claimed is:

1. A device for selective laser sintering of a powder comprising:

a jacket having a design space for receiving the powder and a design space bottom, the jacket encircling the design space, and capable of heating different regions of the jacket separately so as to develop a temperature distribution decreasing toward the design space bottom; and a laser configured to perform selective laser sintering of a top layer of the powder in the design space.

2. The device as recited in claim 1, wherein the design space has a cylindrical design, the jacket including a heating device including heating rings disposed in parallel one over another and arranged concentrically around the design space.

3. The device as recited in claim 2, wherein at least one control device-is contained for controlling the individual heating rings separately.

4. The device as recited in claim 3, wherein the at least one control device features an input unit for entering a temperature distribution to be adjusted via the heating rings.

* * * * *